United States Patent
Lin et al.

(10) Patent No.: US 9,213,448 B2
(45) Date of Patent: Dec. 15, 2015

(54) POSITIONING MODULE, OPTICAL TOUCH SYSTEM AND METHOD OF CALCULATING A COORDINATE OF A TOUCH MEDIUM

(71) Applicant: PixArt Imaging Inc., Hsin-Chu (TW)

(72) Inventors: Yu-Chia Lin, Hsin-Chu (TW); Chun-Yi Lu, Hsin-Chu (TW); Chun-Sheng Lin, Hsin-Chu (TW); Yu-Hsiang Huang, Hsin-Chu (TW); Hsin-Chi Cheng, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 134 days.

(21) Appl. No.: 14/097,257

(22) Filed: Dec. 5, 2013

(65) Prior Publication Data

US 2014/0146019 A1 May 29, 2014

Related U.S. Application Data

(63) Continuation-in-part of application No. 13/848,720, filed on Mar. 21, 2013.

(30) Foreign Application Priority Data

Nov. 29, 2012 (TW) .............................. 101144727 A

(51) Int. Cl.
*G06F 3/042* (2006.01)
(52) U.S. Cl.
CPC .................................... *G06F 3/0428* (2013.01)
(58) Field of Classification Search
CPC ..... G06F 3/0418; G06F 3/042; G06F 3/0421; G06F 3/0428
See application file for complete search history.

(56) References Cited

U.S. PATENT DOCUMENTS

| | | | |
|---|---|---|---|
| 6,791,700 B2 | 9/2004 | Omura | |
| 7,006,236 B2 | 2/2006 | Tomasi | |
| 7,050,177 B2 | 5/2006 | Tomasi | |
| 7,515,141 B2 * | 4/2009 | Kobayashi | 345/173 |
| 7,538,894 B2 * | 5/2009 | Kobayashi | 356/614 |
| 7,689,381 B2 | 3/2010 | Lin | |
| 8,180,114 B2 | 5/2012 | Nishihara | |
| 8,330,726 B2 * | 12/2012 | Ogawa et al. | 345/173 |
| 8,405,607 B2 * | 3/2013 | Raynor | 345/157 |
| 8,432,377 B2 * | 4/2013 | Newton | 345/175 |
| 8,436,834 B2 | 5/2013 | Cheng | |
| 8,610,693 B2 | 12/2013 | Onishi | |

(Continued)

FOREIGN PATENT DOCUMENTS

TW 201112091 4/2011
TW 201137704 11/2011

(Continued)

*Primary Examiner* — Lun-Yi Lao
*Assistant Examiner* — Peter D McLoone
(74) *Attorney, Agent, or Firm* — Winston Hsu; Scott Margo

(57) ABSTRACT

A method of calculating a coordinate of a touch medium is disclosed in the present invention. The method includes obtaining a first image to determine whether the first image overlaps a first threshold, generating a first interceptive boundary when the first image overlaps the first threshold, obtaining a second image to generate a second interceptive boundary by overlap of the second image and a second threshold, determining whether the first interceptive boundary overlaps the second interceptive boundary, and confirming a status of the touch medium according to determination.

22 Claims, 6 Drawing Sheets

(56) References Cited

U.S. PATENT DOCUMENTS

| | | |
|---|---|---|
| 8,624,877 B2 | 1/2014 | Lai |
| 8,675,913 B2 | 3/2014 | Chen |
| 8,681,124 B2 * | 3/2014 | Bamji et al. ................. 345/175 |
| 8,711,125 B2 * | 4/2014 | Zhu et al. ................... 345/175 |
| 8,717,315 B2 | 5/2014 | Kao |
| 2002/0024676 A1 | 2/2002 | Fukuzaki |
| 2003/0218760 A1 | 11/2003 | Tomasi |
| 2003/0218761 A1 | 11/2003 | Tomasi |
| 2006/0232792 A1 * | 10/2006 | Kobayashi ................... 356/621 |
| 2007/0089915 A1 * | 4/2007 | Ogawa et al. ............. 178/18.09 |
| 2009/0058833 A1 * | 3/2009 | Newton ....................... 345/175 |
| 2009/0090569 A1 | 4/2009 | Lin |
| 2010/0010773 A1 | 1/2010 | Lin |
| 2010/0156820 A1 | 6/2010 | Lin |
| 2010/0309169 A1 * | 12/2010 | Lieberman et al. .......... 345/175 |
| 2011/0018822 A1 | 1/2011 | Lin |
| 2011/0032215 A1 | 2/2011 | Sirotich |
| 2011/0050649 A1 * | 3/2011 | Newton et al. ............... 345/175 |
| 2011/0052007 A1 | 3/2011 | Chen |
| 2011/0061950 A1 | 3/2011 | Cheng |
| 2011/0063253 A1 | 3/2011 | Kiyose |
| 2011/0080363 A1 | 4/2011 | Kao |
| 2011/0102375 A1 * | 5/2011 | Liu et al. ...................... 345/175 |
| 2011/0116104 A1 | 5/2011 | Kao |
| 2011/0116105 A1 * | 5/2011 | Zhu et al. ..................... 356/621 |
| 2011/0148758 A1 * | 6/2011 | Hashimoto ................... 345/157 |
| 2011/0193969 A1 | 8/2011 | Tsai |
| 2011/0234542 A1 | 9/2011 | Marson |
| 2011/0261016 A1 | 10/2011 | Huang |
| 2011/0279413 A1 | 11/2011 | Lai |
| 2011/0291924 A1 * | 12/2011 | Raynor ......................... 345/157 |
| 2011/0291988 A1 * | 12/2011 | Bamji et al. .................. 345/175 |
| 2012/0249418 A1 | 10/2012 | Onishi |
| 2012/0262423 A1 | 10/2012 | Su |
| 2013/0135255 A1 | 5/2013 | Gally |
| 2013/0162601 A1 * | 6/2013 | Su et al. ....................... 345/175 |
| 2013/0264462 A1 | 10/2013 | Huang |
| 2014/0091200 A1 | 4/2014 | Cheng |
| 2014/0098062 A1 | 4/2014 | Lin |
| 2014/0104238 A1 | 4/2014 | Lu |
| 2015/0253934 A1 * | 9/2015 | Lin ....................... G06F 3/0428 345/175 |

FOREIGN PATENT DOCUMENTS

| | | |
|---|---|---|
| TW | 201140401 | 11/2011 |
| TW | 201145116 | 12/2011 |
| TW | 201201078 | 1/2012 |

* cited by examiner (By the first light source)

(By the second light source)

POSITIONING MODULE, OPTICAL TOUCH SYSTEM AND METHOD OF CALCULATING A COORDINATE OF A TOUCH MEDIUM

CROSS REFERENCE TO RELATED APPLICATIONS

This application is a continuation in part of U.S. application Ser. No. 13/848,720, filed 2013 Mar. 21.

BACKGROUND OF THE INVENTION

1. Field of the Invention

The present invention relates to a positioning module, an optical touch system and a method of a calculating coordinate of the touch medium, and more particularly, to a positioning module, an optical touch system and a method of calculating a coordinate of the touch medium that are able to actuate coordinate calculation when the touch medium contacts a touch panel.

2. Description of the Prior Art

A light source of the conventional optical touch module is disposed above the optical detector, the optical shelter path can be effective when an object is put into a projecting range of the light source, and the optical touch module can calculate the correct position of the object. However, position of the light source is higher than position of the camera of the optical detector. Beam emitted from the light source is shadowed by the object before the object contacts the touch plane, and the optical detector is actuated to detect motion of the object when the object does not contact the touch plane. As the light source and the optical detector are disposed on the same perpendicular plane, a dark area, which is formed when the beam emitted from the light source is shadowed by the object, is deviated because the optical detector misaligns with an optical path from the light source to the object, so that the optical detector can not calculate the correct position of the object according to the captured image. Thus, design of an optical touch system capable of actuating the coordinate calculation when the object contacts or almost contacts the touch plane for correct position of the object is an important issue in the optical touch industry.

SUMMARY OF THE INVENTION

The present invention provides a positioning module, an optical touch system and a method of calculating coordinates of the touch medium that can actuate the coordinate calculation when the touch medium contacts a touching panel for solving above drawbacks.

According to the claimed invention, a method of calculating a coordinate of a touch medium is disclosed. The method includes obtaining a first image to determine whether the first image overlaps a first threshold, generating a first interceptive boundary when the first image overlaps the first threshold, obtaining a second image to generate a second interceptive boundary by overlap of the second image and a second threshold, determining whether the first interceptive boundary overlaps the second interceptive boundary, and confirming a status of the touch medium according to determination.

According to the claimed invention, a positioning module for calculating a coordinate of a touch medium is disclosed. The positioning module includes at least one image detecting unit and a processor. The image detecting unit is adapted to capture a first image generated by a first beam emitted from a lateral side of the image detecting unit, and is further adapted to capture a second image generated by a second beam emitted from an upper side of the image detecting unit. The processor is electrically connected to the image detecting unit. The processor is adapted to generate a first interceptive boundary when the first image overlaps a first threshold, and to generate a second interceptive boundary when the second image overlaps a second threshold. The processor further determines whether the first interceptive boundary overlaps the second interceptive boundary for confirming a status of the touch medium according to determination.

According to the claimed invention, an optical touch system for calculating a coordinate of a touch medium is disclosed. The optical touch system includes a panel and a positioning module. The positioning module is disposed on the panel. The positioning module includes at least one image detecting unit and a processor. The image detecting unit is adapted to capture a first image generated by a first beam emitted from a lateral side of the image detecting unit, and is further adapted to capture a second image generated by a second beam emitted from an upper side of the image detecting unit. The processor is electrically connected to the image detecting unit. The processor is adapted to generate a first interceptive boundary when the first image overlaps a first threshold, and to generate a second interceptive boundary when the second image overlaps a second threshold. The processor further determines whether the first interceptive boundary overlaps the second interceptive boundary for confirming a status of the touch medium according to determination.

According to the claimed invention, a positioning module for calculating a coordinate of a touch medium is disclosed. The positioning module includes at least one image detecting unit and a processor. The image detecting unit is adapted to capture a first image generated by a first beam emitted from a lateral side of the image detecting unit, and is further adapted to capture a second image generated by a second beam emitted from an upper side of the image detecting unit. The processor is electrically connected to the image detecting unit. The processor drives the image detecting unit to capture the first image, and drives the image detecting unit to capture the second image if the first image overlaps a first threshold. The first image is used to determine a first interceptive boundary when the first image overlaps the first threshold, and the second image is used to determine a second interceptive boundary when the second image overlaps a second threshold. The processor is adapted to determine whether the first interceptive boundary overlaps the second interceptive boundary and confirm a status of the touch medium according to determination.

The optical touch system of the present invention can prevent the coordinate calculation from error because the touch medium does not contact the panel, and can rapidly acquire the coordinates of the touch medium relative to the panel for enhancement of the positioning speed and calculating accuracy.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
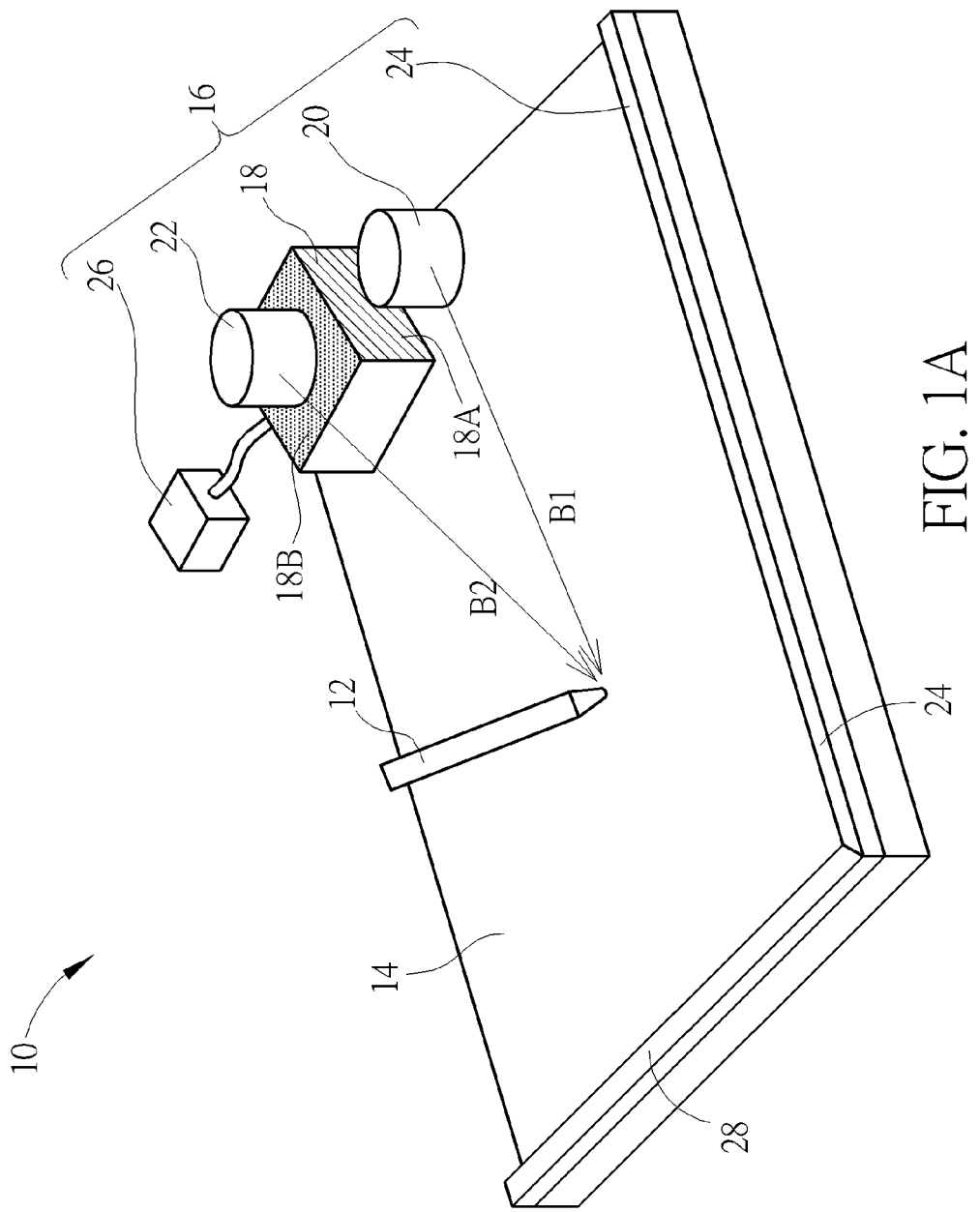
FIG. 1A is a diagram of an optical touch system according to an embodiment of the present invention.

Please refer to FIG. 1A. FIG. 1A is a diagram of an optical touch system 10 according to an embodiment of the present invention. A touch medium 12 can be utilized to draw a track, and the optical touch system 10 can detect coordinates of the touch medium 12 so as to output the corresponding operation command according to the coordinate variation. The optical touch system 10 includes a panel 14 and a positioning module 16. The touch medium 12 can move on a surface of the panel 14. The positioning module 16 is disposed on the panel 14 for calculating the coordinates of the touch medium 12. Generally, the touch medium 12 can be user's finger or the stylus.

As shown in FIG. 1A, the positioning module 16 includes at least one image detecting unit 18, a first light source 20, a second light source 22, a reflection component 24 and a processor 26. The reflection component 24 is disposed on at least one side of the panel 14. The image detecting unit 18, the first light source 20 and the second light source 22 are disposed on the other side of the panel 14 relative to the reflection component 24. The first light source 20 is disposed on a lateral side 18A (the slash area) of the image detecting unit 18, the second light source 22 is disposed on an upper side 18B (the dotted area) of the image detecting unit 180. The first light source 20 and the second light source 22 respectively emit a first beam B1 and a second beam B2. The first beam B1 and the second beam B2 are reflected by the reflection component 24 to project on the image detecting unit 18. The image detecting unit 18 is adapted to capture a first image generated by the first beam B1, and is further adapted to capture a second image generated by the second beam B1. A mirror component 28 can be disposed on the side of the panel 14 opposite to the image detecting unit 18, and the image detecting unit 18 can simultaneously capture a real image and a virtual image of the touch medium 12 for coordinate calculation.

Figure 1B:
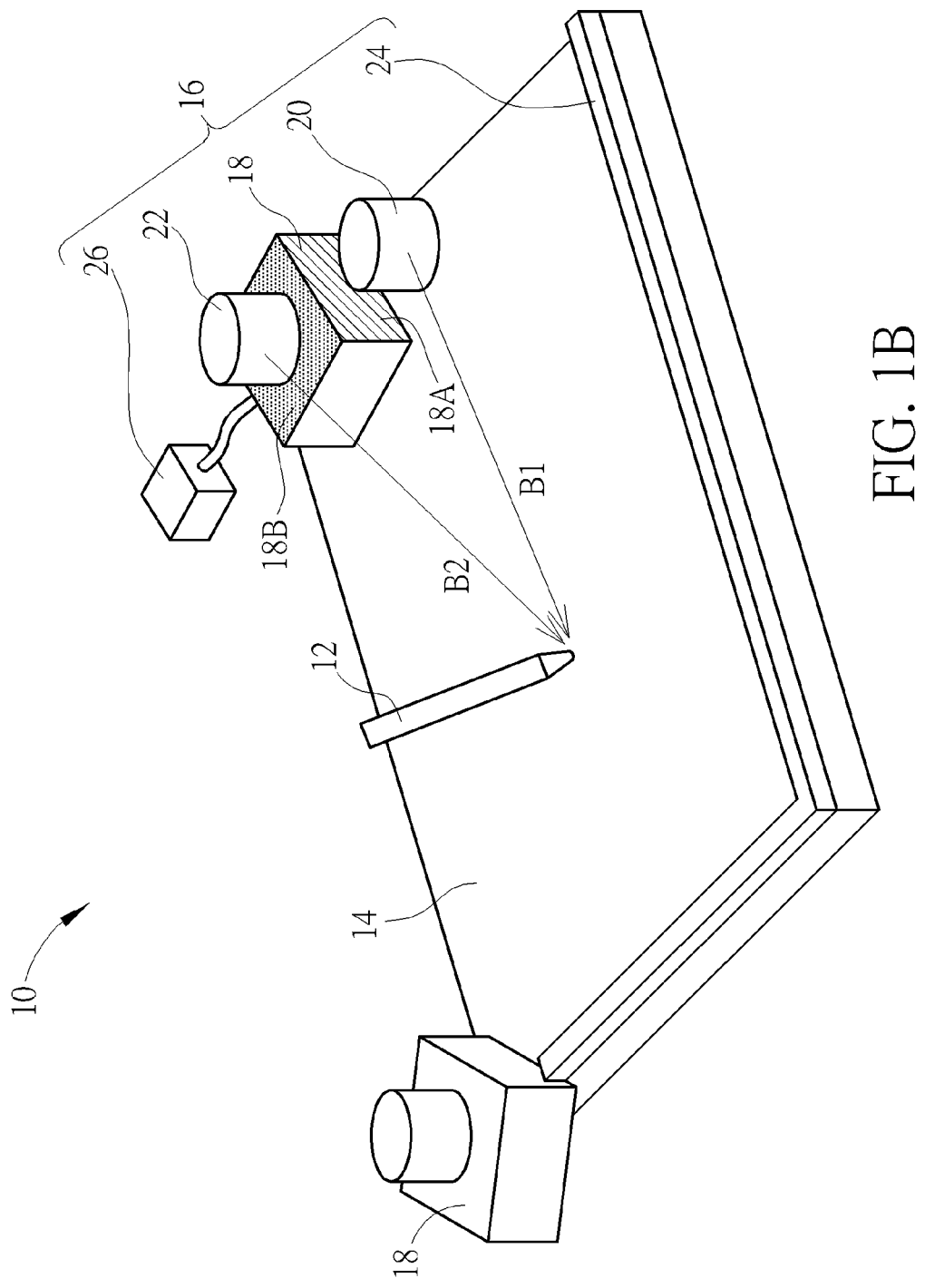
FIG. 1B is a diagram of the optical touch system according to the other embodiment of the present invention.

The positioning module 16 can further include a plurality of image detecting units 18 respectively disposed on corners or sides of the panel 14, as shown in FIG. 1B. The light source is disposed on the upper side of each image detecting unit 18. FIG. 1B is a diagram of the optical touch system 10 according to the other embodiment of the present invention. The positioning module 16 can utilize image positions of the touch medium 12 projected on the image detecting units 18 to calculate the coordinates by triangulation method. An amount and disposition of the image detecting unit 18 is not limited to the above-mentioned embodiment, and depend on design demand.

In addition, the processor 26 is electrically connected to the image detecting unit 18. The processor 26 is adapted to generate a first interceptive boundary I1-I1' when the first image overlaps a first threshold T1, and further to generate a second interceptive boundary I2-I2' when the second image overlaps a second threshold T2, and then the processor 26 determines whether the first interceptive boundary I1-I1' overlaps the second interceptive boundary I2-I2', to confirm a status of the touch medium 12 according to determination. The first beam B1 is shadowed when the touch medium 12 moves into detection range of the positioning module 16. A part of the first beam B1 is shadowed to generate a first dark area on the reflection component 24. The image detecting unit 18 can capture the first image with the first dark area. Then, the processor 26 analyzes an intensity of the first dark area on the first image to determine the touch status of the touch medium 12 relative to the panel 14. The first dark area may cover one or more columns. A comparing threshold can further be set for determining whether the first dark area is generated. For example, the present invention can set the comparing threshold as three columns, so that the shadowed image with dimensions smaller than three columns does not belong to the first dark area.

The processor 26 compares an intensity of the first image to a threshold value, and determined whether the touch medium 12 contacts the panel 14 according to a comparison. The intensity of the first image includes a plurality of intensity magnitudes, and each intensity magnitude corresponds to a typical value of the each column of the first image. The threshold value includes a plurality of threshold magnitudes, and these threshold magnitudes respectively correspond to intensity thresholds of a plurality of columns of the first image. When the intensity magnitude of one column of the first image is lower than the corresponding intensity thresholds, the column can be within the first dark area of the first image. The processor 26 can determine that the touch medium 12 has contacted the panel 14 according to the intensity magnitude of the first dark area.

The processor 26 further can determine a touch position of the touch medium 12 on the panel 14 according to the second image captured by the image detecting unit 18. When the touch medium 12 is put on the panel 14, a part of the second beam B2 is shadowed by the touch medium 12, and a second dark area is formed on the reflection component 24. Then, the processor 26 can compare a plurality of intensity magnitudes of the second image to the at least one threshold value, so as to find out the imaging position of the second dark area on the second image, and to determine the touch position of the touch medium 12 on the panel 14 (which means the coordinates of the touch medium 12 can be calculated). The second dark area may cover one or more columns. A comparing threshold can further be set for determining whether the second dark area is generated. For example, the present invention can set the comparing threshold as three columns, so that the shadowed image with dimensions smaller than three columns does not belong to the second dark area.

As shown in FIG. 1A, the first light source 20 is disposed on the lateral side 18A, the second light source 22 is disposed on the upper side 18B, so that a distance between the first light source 20 and the surface of the panel 14 (the plane where the touch medium 12 moves) is substantially smaller than a distance between the second light source 22 and the surface of the panel 14. Regards to the panel 14, the first light source 20 shares the same vertical position with the image detecting unit 18, and the second light source 22 shares the same horizontal position with the image detecting unit 18. When the touch medium 12 moves into the detection range of the positioning module 16, the processor 26 drives the image detecting unit 18 to capture the first image, and determines the touch status according to the intensity of the first dark area on the first image. As the touch medium 12 contacts the panel 14 (or a distance between the touch medium 12 and the panel 14 is smaller than a predetermined value), the processor 26 can start the analysis of the second image, so as to calculate the touch position (the coordinates) of the touch medium 12 on the panel 14.

It should be mentioned that the processor 26 can be electrically connected to the first light source 20 and the second light source 22, selectively. The processor 26 can respectively actuate the image detecting unit 18, the first light source 20 and the second light source 22. The image detecting unit 18 is actuated to respectively capture the first image and the second image, and the processor 26 can analyze the first image and the second image to determine the touch status and the touch position. For energy consumption of the positioning module 16, the processor 26 can control the first light source 20 and the second light source 22 to respectively output the first beam B1 and the second beam B2. Emitting period of the first light source 20 and the second light source 22 can be different. As the positioning module 16 includes the plurality of image detecting units 18, the first light source 20 and the second light source 22 can simultaneously or respectively emit the beams. In a power saving mode, the processor 26 can actuate the first light source 20 to generate the first image, analyze the first image, shut down the first light source 20 when the touch medium 12 contacts the panel 14, and then actuate the second light source 22 to generate the second image. Therefore, the present invention not only can effectively calculate the correct touch position of the touch medium 12 on the panel 14, but also can economize the energy of the light sources.

Figure 2:
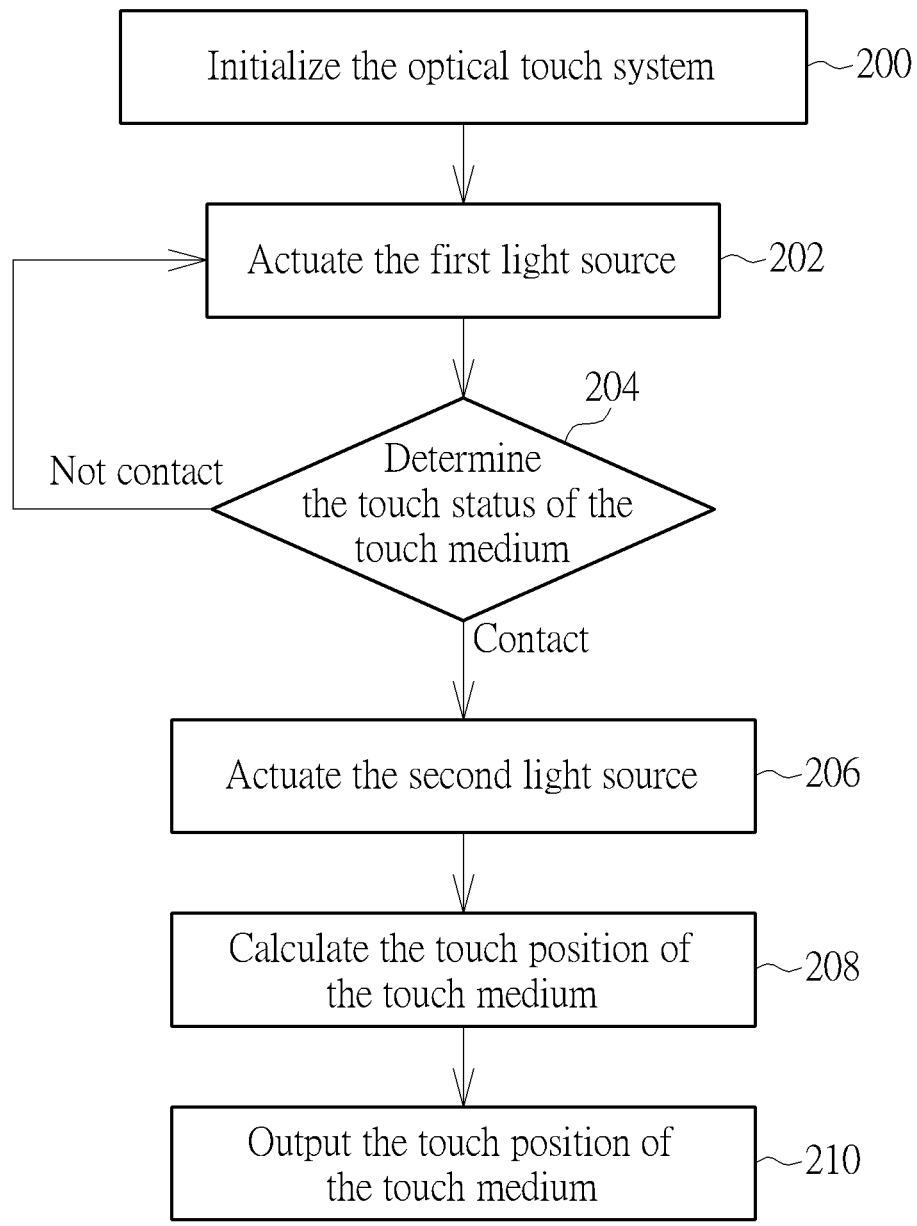
FIG. 2 is a flow chart of calculating the coordinates of a touch medium according to a first embodiment of the present invention.

Please refer to FIG. 2. FIG. 2 is a flow chart of calculating the coordinates of the touch medium 12 according to a first embodiment of the present invention. The method of calculating the coordinates of the touch medium 12 shown in FIG. 2 is applied to the optical touch system 10 shown in FIG. 1A. First, step 200 is executed to initialize the optical touch system 10. Then, step 202 is executed to actuate the first light source 20. The first light source 20 emits the first beam B1, and the first beam B1 is reflected by the reflection component 24 to project the first image on the image detecting unit 18. Then, step 204 is executed to determine the touch status of the touch medium 12. When the touch medium 12 is put on the panel 14, a part of the first beam B1 is shadowed by the touch medium 12 to generate the first dark area, so the first image captured by the image detecting unit 18 has the first dark area. The processor 26 can compare the intensity of the first dark area on the first image to the threshold value, and determine whether the touch medium 12 contacts the panel 14. As the intensity is greater than the threshold value, the touch medium 12 does not contact the panel 14 and step 202 is executed. As the intensity is smaller than the threshold value, the touch medium 12 contacts the panel 14, and step 206 is executed to actuate the second light source 22. Meanwhile, the first light source 20 can be selectively shut down for the energy economy.

The second light source 22 can emit the second beam B2. The second beam B2 is reflected by the reflection component 24 to project the second image on the image detecting unit 18. Because the touch medium 12 is put on the panel 14, the part of the second beam B2 is shadowed by the touch medium 12 to generate the second dark area. Then, step 208 is executed to calculate the position of the touch medium 12. The processor 26 can calculate the touch position (the coordinates) of the touch medium 12 on the panel 14 according to the position of the second dark area on the second image. Step 210 is executed to output the coordinates of the touch medium 12 on the panel 14 by the processor 26, so as to be the control command to execute the corresponding application program. Meanwhile, the second light source 22 can be shut down.

After output of the coordinates, the positioning module 16 finishes the touch detection, and step 202 is executed again to actuate the first light source 20 for driving the image detecting unit 18 to capture the first image, and to drive the processor 26 to determine the touch status of the touch medium 12 at next phase according to the first image.

Figure 3:
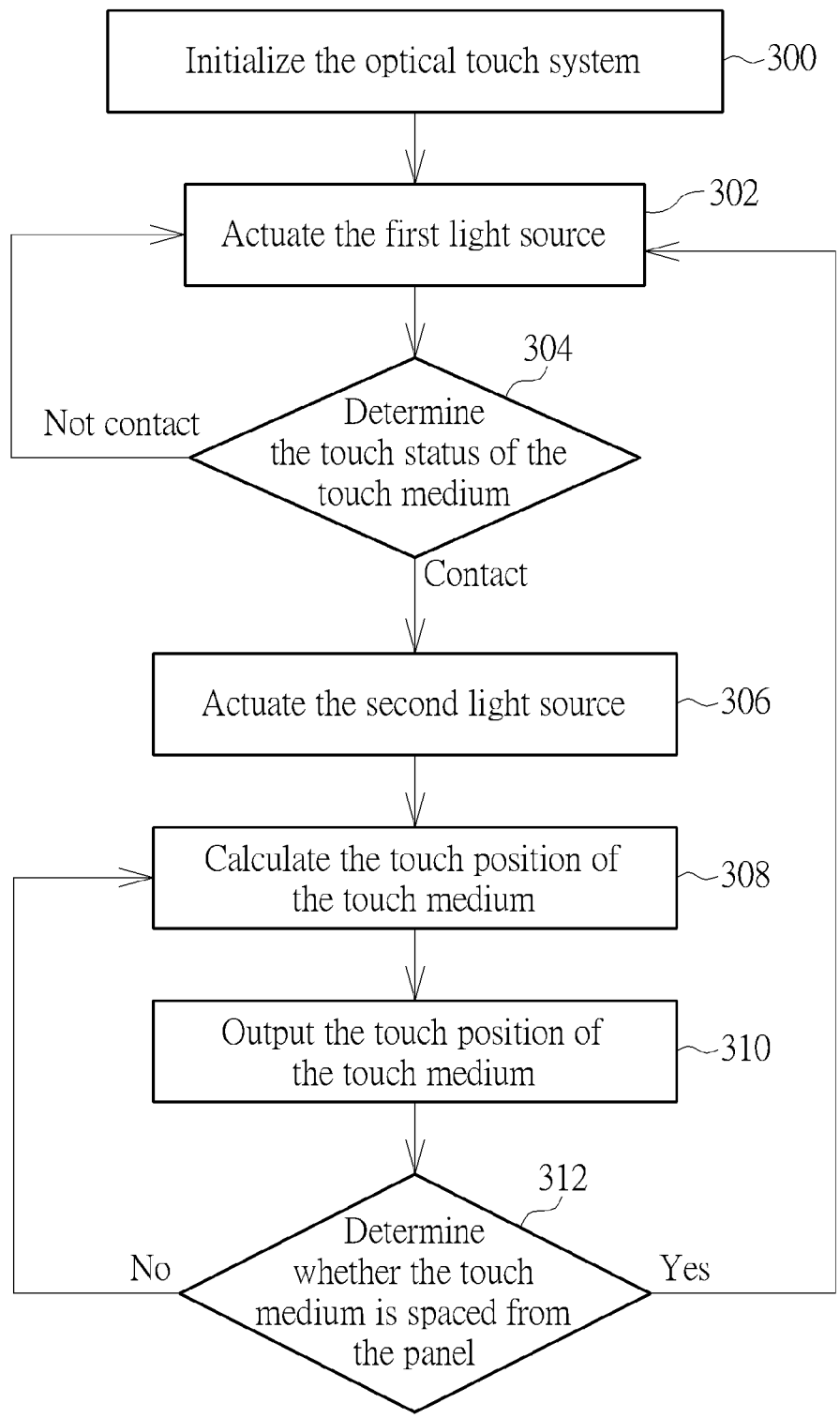
FIG. 3 is a flow chart of calculating the coordinates of the touch medium according to a second embodiment of the present invention.

Please refer to FIG. 3. FIG. 3 is a flow chart of calculating the coordinates of the touch medium 12 according to a second embodiment of the present invention. The method of calculating the coordinates of the touch medium 12 shown in FIG. 3 is applied to the optical touch system 10 shown in FIG. 1A. Steps 300-310 for calculating the coordinates of the touch medium 12 in the second embodiment are substantially the same as steps 200-210 mentioned in the first embodiment. The other power saving mode is disclosed in the second embodiment. Difference between the second embodiment and the first embodiment is that method in the second embodiment can execute step 312 after the coordinates of the touch medium 12 is outputted, so as to determine whether the touch medium 12 is spaced from the panel 14. As the touch medium 12 is not spaced from the panel 14, the image detecting unit 18 can capture the second image for the second time, and the processor 26 can analyze the imaging position of the second dark area to calculate the touch position of the touch medium 12 at the next phase. As the touch medium 12 is spaced from the panel 14, the processor 26 can shut down the second light source 22 and actuate the first light source 20, and drive the image detecting unit 18 to capture the first image. The processor 26 can analyze the first dark area on the captured first image to determine the touch status of the touch medium 12 at the next phase.

For the energy economy, step 312 is the second embodiment discloses that the processor 26 compares the intensity of the second image to the threshold value. When the intensity are greater than the corresponding threshold value, the second dark area is disappeared, which means the touch medium 12 is spaced from the panel 14, so that step 302 is executed to actuate detection of the touch status of the touch medium 12. When at least one of the intensity is lower than the corresponding threshold value, the second dark area exists because the second beam B2 is shadowed by the touch medium 12, which means the touch medium 12 is within the detection range of the positioning module 16, and the touch medium 12 is not spaced from the panel 14, so that step 308 is executed to calculate the touch position of the touch medium 12 at the next phase.

Figure 4:
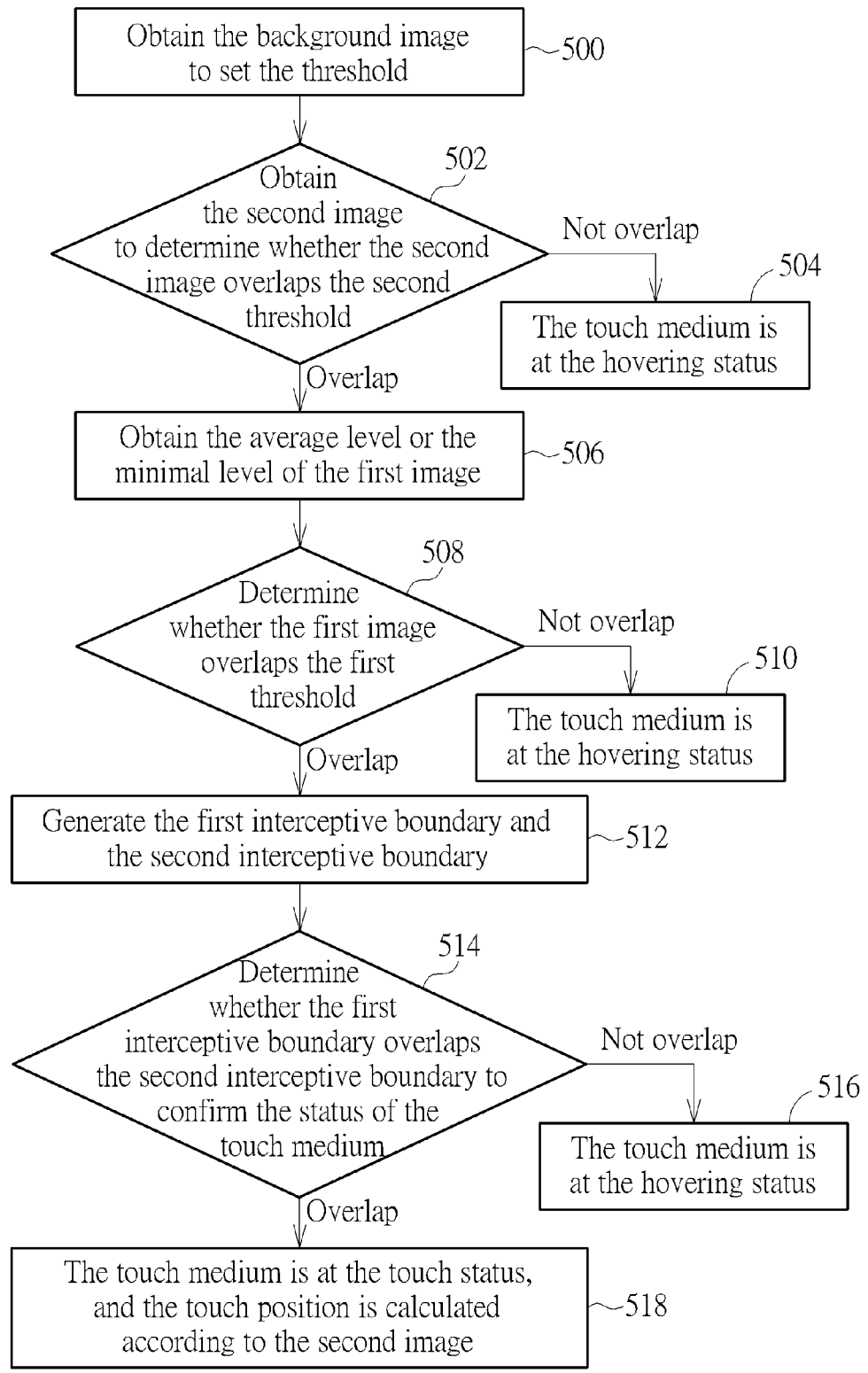
FIG. 4 is a flow chart of calculating the coordinates of the touch medium according to a third embodiment of the present invention.
Figure 5:
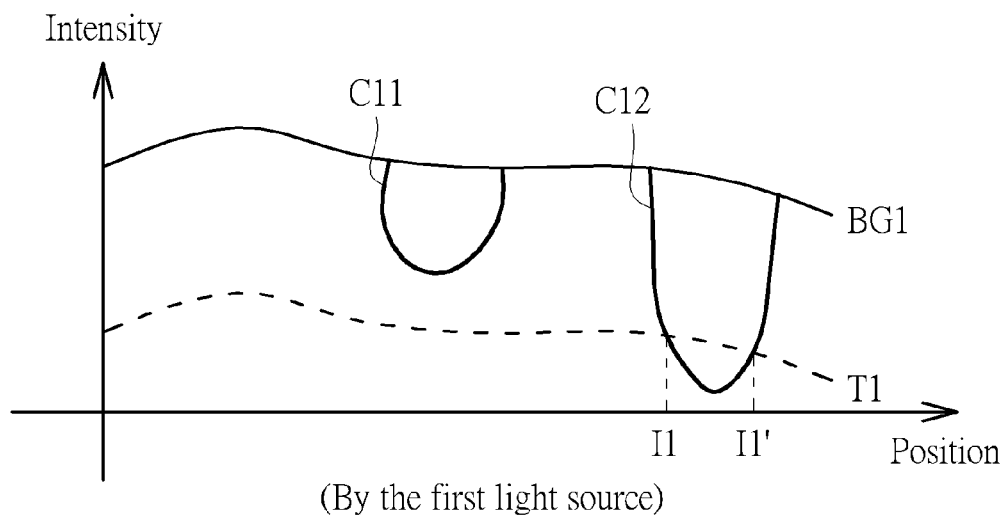
FIG. 5 is a comparative diagram of information detected by the image detecting unit via the first and second light sources and the second light source according to the third embodiment of the present invention.
Figure 5:
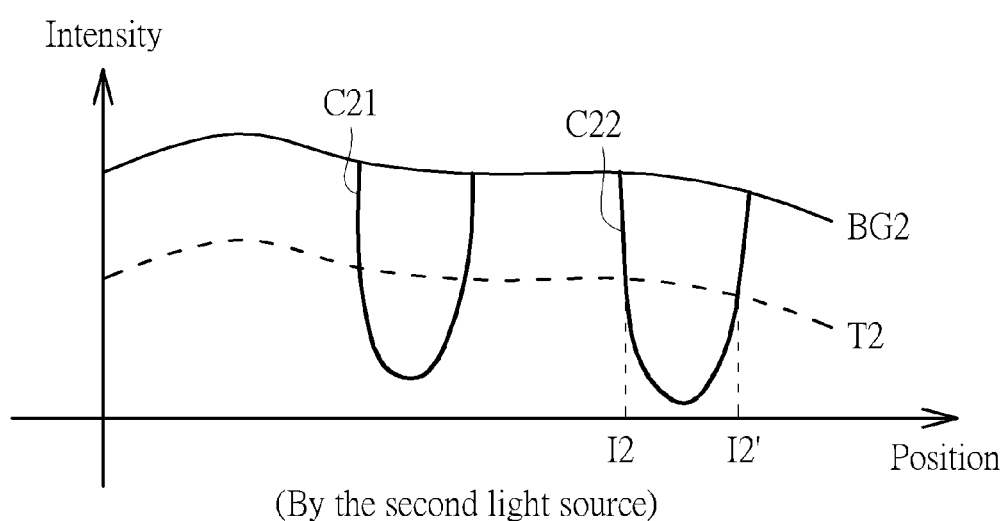

Please refer to FIG. 4 and FIG. 5. FIG. 4 is a flow chart of calculating the coordinates of the touch medium 12 according to a third embodiment of the present invention. FIG. 5 is a comparative diagram of information detected by the image detecting unit 18 via the first light source 20 and the second light source 22 according to the third embodiment of the present invention. The method illustrated in FIG. 4 especially focuses on procedures of determining the status of the touch medium 12 by comparison of the image intensity and the predetermined threshold. Before formal detection, step 500 is executed to obtain a first background image and a second background image and respectively to set a first threshold and a second threshold. The image detecting unit 18 obtains the first background image by the first light source 20, and obtains the second background image by the second light source 22. The processor 26 receives raw images of the first background image and the second background image, and then transforms the raw images into corresponding profiles BG1 and BG2, as shown in FIG. 5. The threshold can be determined in several ways, such as being proportional to the profile of the background image. The first threshold T1 and the second threshold T2 can respectively be different percentages of the profiles of the first background image BG1 and the second background image BG2, and the first threshold T1 is substantially smaller than the second threshold T2.

As the optical touch system 10 is started, step 502 is executed to obtain the second image for initial inspection by determining whether the second image overlaps the second threshold T2. The processor 26 can transform a raw image (n*m pixels, n and m are respectively greater than one) into a profile (n*1 pixels, n is greater than one), and utilizes the profile to compare with the threshold. It should be mentioned the processor 26 calculates a specific value of the profile, the specific value can be an average level or a minimal level etc., and the processor 26 compares the profile with the threshold by determining whether the specific value is lower than the threshold. The touch medium 12 is at a hovering status when the second image (not shown in figures) does not overlap the second threshold T2, and step 504 is executed that the processor 26 determines the coordinate calculation is not actuated. Step 506 is executed to obtain the average level or the minimal level of the first image when the second image (such as the signature C21, C22) overlaps the second threshold T2. The second image overlaps the second threshold T2 does not mean the touch medium 12 directly contacts the panel 14, so that the method of the present invention continuously utilizes the first light source 20 to detect the correct status of the touch medium 12.

After the image detecting unit 18 obtains the first image, step 508 is executed to determine whether the first image overlaps the first threshold T1. The touch medium 12 hovers above the panel 14 when the profile of the first image (such as the signature C11) does not overlap the first threshold T1; in the meantime, though the profile of the second image C21 overlaps the second threshold T2, step 510 is executed to determine the touch medium 12 is at the hovering status by the processor 26. Further, the touch medium 12 contacts the panel 14 when the profile of the first image (such as the signature C12) overlaps the first threshold T1, and step 512 is executed to generate the first interceptive boundary I1-I1', and the second interceptive boundary I2-I2' is accordingly generated by overlap of the second image C22 and the second threshold T2. Generally, the second image C22 overlaps the second threshold T2 while the first image C12 overlaps the first threshold T1 because the second threshold T2 is greater than the first threshold T1.

The optical touch system 10 of the present invention provides a multiple touch function, and the method applied to the optical touch system 10 can distinguish whether the detected first image and the related second images belong to the same touch medium 12 or not. Step 514 is executed to determine whether the first interceptive boundary I1-I1' overlaps the second interceptive boundary I2-I2', so as to confirm the status of the touch medium 12 according to above-mentioned determination. When the first interceptive boundary I1-I1' does not overlap the second interceptive boundary I2-I2', the first image C12 and the second image C22 may be generated according to different touch media 12, more than one touch medium 12 located above the panel 14, and step 516 is executed to confirm the touch medium 12 is at the hovering status. When the first interceptive boundary I1-I1' overlaps the second interceptive boundary I2-I2', the dark areas projected on the first image C12 and the second image C22 represent the same touch medium 12, step 518 is executed to confirm the touch medium 12 is at a touch status, and the touch position is calculated according to the second image C22 by the processor 26.

In the first embodiment, the processor 26 actuates the detection of the touch status of the touch medium 12 after the processor 26 outputs the touch position of the touch medium 12, so as to calculate all coordinates of the touch medium 12 when the touch medium 12 moves through the panel 12. The processor 26 repeatedly actuates the detection of the touch status of the touch medium 12 regardless of position of the touch medium 12 relative to the positioning module 16 (the touch medium 12 may be inside or outside the detection range of the positioning module 16), so as to ensure that the positioning module 16 can catch every position of the touch medium 12 when the touch medium 12 moves over the panel 12. In the second embodiment, the processor 26 can determine whether the touch medium 12 is spaced from the panel 12 after the processor 26 outputs the last touch position of the touch medium 12. As the touch medium 12 is not spaced from the panel 14, the positioning module 16 can utilize the processor 26 to immediately analyze the second image captured by the image detecting unit 18, so as to calculate the touch position of the touch medium 12 at the present phase. Therefore, the optical touch system 10 of the present invention can utilize the method shown in FIG. 2 to increase calculation speed of the coordinate detection and to economize the energy consumption of the first light source 20.

The third embodiment details the method of distinguishing the touch medium 12 into different statuses. The processor 26 sets the first threshold T1 and the second threshold T2 by different percentages. The touch medium 12 is at the hovering status when the first image C11 does not overlap the first threshold T1 regardless of the overlap between the second image C21, C22 and the second threshold T2. For example, as the processor 26 drives the image detecting unit 18 to capture the first image, the image detecting unit 18 is driven to capture the second image C22 when the first image C12 overlaps the first threshold T1, or the image detecting unit 18 does not capture the second image C21 because the first image C11 does not overlap the first threshold T1. The touch medium 12 is at the hovering status even through the first image C12 overlaps the first threshold T1 and the first interceptive boundary I1-I1' does not overlap the second interceptive boundary I2-I2'. It is to say, the touch medium 12 is at the touch status when the first image C12 overlaps the first threshold T1, the first interceptive boundary I1-I1' overlaps the second interceptive boundary I2-I2', and the second image C22 overlaps the second threshold T2 certainly. For the above reason, the method illustrated in the third embodiment can accurately make out the status of the touch medium, so as to determine whether the optical touch system 10 is switched to the power saving mode (when the touch medium is at the hovering status) or the coordinate detecting mode (when the touch medium is at the touch status).

In conclusion, the optical touch system of the present invention utilizes the two light sources disposed on different positions, so that the positioning module can detect whether the touch medium contacts the panel in advance, and then execute the coordinate calculation when the touch medium has contacted the panel. The present invention not only can calculate the correct coordinates of the touch medium on the panel, but also can economize the energy of light sources. The first light source disposed on the lateral side of the image detecting unit can generate the first dark area when the touch medium contacts the panel. The positioning module compares the intensity of the first dark area to the threshold value, and determines the touch status of the touch medium relative to the panel. The second light source disposed on the upper side of the image detecting unit can be actuated after the touch medium contacts the panel, and the positioning module can calculate the touch position of the touch medium on the panel accurately. Thus, the optical touch system of the present invention can prevent the coordinate calculation from error because the touch medium does not contact the panel, and can rapidly acquire the coordinates of the touch medium relative to the panel for enhancement of the positioning speed and calculating accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of calculating a coordinate of a touch medium, the method comprising:
   obtaining a first image to determine whether the first image overlaps a first threshold;
   generating a first interceptive boundary when the first image overlaps the first threshold;
   obtaining a second image to generate a second interceptive boundary by overlap of the second image and a second threshold; and
   confirming the touch medium is at a hovering status when the first interceptive boundary does not overlap the second interceptive boundary.

2. The method of claim 1, wherein the method of confirming the status of the touch medium further comprises:
   confirming the touch medium is at a touch status when the first interceptive boundary overlaps the second interceptive boundary; and
   calculating a touch position of the touch medium according to the second image.

3. The method of claim 1, further comprising:
   obtaining a first background image and a second background image to respectively set the first threshold and the second threshold.

4. The method of claim 3, wherein the first threshold is a percentage of the first background image, the second threshold is another percentage of the second background image, and the first threshold is substantially smaller than the second threshold.

5. The method of claim 1, wherein the method of obtaining the first image to determine whether the first image overlaps the first threshold further comprises:
   receiving a raw image of the first image;
   transforming the raw image into a profile; and
   utilizing the profile of the first image to compare with the first threshold.

6. The method of claim 5, wherein the method of utilizing the profile of the first image to compare with the first threshold further comprises:
   calculating a specific value of the profile; and
   determining whether the specific value is lower than the first threshold, wherein the specific value is an average level or a minimal level.

7. The method of claim 1, wherein the first image is captured by an image detecting unit according to a first beam emitted from a first light source, the second image is captured by the image detecting unit according to a second beam emitted from a second light source, the first light source and the second light source are respectively disposed on a lateral side and an upper side of the image detecting unit.

8. A positioning module for calculating a coordinate of a touch medium, the positioning module comprises:
   at least one image detecting unit, the image detecting unit being adapted to capture a first image generated by a first beam emitted from a lateral side of the image detecting unit, and further being adapted to capture a second image generated by a second beam emitted from an upper side of the image detecting unit; and
   a processor electrically connected to the image detecting unit, the processor being adapted to generate a first interceptive boundary when the first image overlaps a first threshold, to generate a second interceptive boundary when the second image overlaps a second threshold, and to confirm the touch medium is at a hovering status when the first interceptive boundary does not overlap the second interceptive boundary.

9. The positioning module of claim 8, wherein the image detecting unit detects a first dark area because a part of the first beam is shadowed by the touch medium, and the processor determines the status according to an intensity of the first dark area on the first image.

10. The positioning module of claim 8, wherein the processor confirms the touch medium is at a touch status when the first interceptive boundary overlaps the second interceptive boundary, and calculates a touch position of the touch medium according to the second image.

11. The positioning module of claim 8, wherein the processor drives the image detecting unit to obtain a first background image and a second background image to respectively set the first threshold and the second threshold, the first threshold is substantially smaller than the second threshold.

12. The positioning module of claim 8, wherein the processor drives the image detecting unit to receive a raw image of the first image, transforms the raw image into a profile, and compares the profile of the first image with the first threshold.

13. The positioning module of claim 12, wherein the processor calculates a specific value of the profile to determine whether the specific value is lower than the first threshold, and the specific value is an average level or a minimal level.

14. The positioning module of claim 8, wherein the processor generates the second interceptive boundary and obtains the first image when the second image overlaps the second threshold.

15. An optical touch system for calculating a coordinate of a touch medium, the optical touch system comprising:
   a panel; and
   a positioning module disposed on the panel, the positioning module comprising:
      at least one image detecting unit, the image detecting unit being adapted to capture a first image generated by a first beam emitted from a lateral side of the image detecting unit, and further being adapted to capture a second image generated by a second beam emitted from an upper side of the image detecting unit; and
      a processor electrically connected to the image detecting unit, the processor being adapted to generate a first interceptive boundary when the first image overlaps a first threshold, to generate a second interceptive boundary when the second image overlaps a second threshold, and to confirm the touch medium is at a hovering status when the first interceptive boundary does not overlap the second interceptive boundary.

16. The optical touch system of claim 15, wherein the image detecting unit detects a first dark area because a part of the first beam is shadowed by the touch medium, and the processor determines the status according to an intensity of the first dark area on the first image.

17. The optical touch system of claim 15, wherein the processor confirms the touch medium is at a touch status when the first interceptive boundary overlaps the second interceptive boundary, and calculates a touch position of the touch medium according to the second image.

18. The optical touch system of claim 15, wherein the processor drives the image detecting unit to obtain a first background image and a second background image to respectively set the first threshold and the second threshold, the first threshold is substantially smaller than the second threshold.

19. The optical touch system of claim 15, wherein the processor drives the image detecting unit to receive a raw image of the first image, transforms the raw image into a profile, and compares the profile of the first image with the first threshold.

20. The optical touch system of claim 19, wherein the processor calculates a specific value of the profile to determine whether the specific value is lower than the first threshold, and the specific value is an average level or a minimal level.

21. The optical touch system of claim 15, wherein the processor generates the second interceptive boundary and obtains the first image when the second image overlaps the second threshold.

22. A positioning module for calculating a coordinate of a touch medium, the positioning module comprises:

at least one image detecting unit, the image detecting unit being adapted to capture a first image generated by a first beam emitted from a lateral side of the image detecting unit, and further being adapted to capture a second image generated by a second beam emitted from an upper side of the image detecting unit; and a processor electrically connected to the image detecting unit, the processor driving the image detecting unit to capture the first image, and driving the image detecting unit to capture the second image if the first image overlaps a first threshold;

wherein the first image is used to determine a first interceptive boundary when the first image overlaps the first threshold, and the second image is used to determine a second interceptive boundary when the second image overlaps a second threshold;

wherein the processor is adapted to confirm the touch medium is at a hovering status when the first interceptive boundary does not overlap the second interceptive boundary.

* * * * *